Nov. 22, 1955 W. L. BOND 2,724,663

PLURAL METAL VAPOR COATING

Filed Oct. 23, 1952 2 Sheets-Sheet 1

INVENTOR
W. L. BOND
BY N. S. Ewing
ATTORNEY

Nov. 22, 1955 W. L. BOND 2,724,663
PLURAL METAL VAPOR COATING
Filed Oct. 23, 1952 2 Sheets-Sheet 2

INVENTOR
W. L. BOND
BY N. S. Ewing
ATTORNEY

United States Patent Office 2,724,663

Patented Nov. 22, 1955

2,724,663

PLURAL METAL VAPOR COATING

Walter L. Bond, New Providence, N. J., assignor to Bell Telephone Laboratories, Incorporated, New York, N. Y., a corporation of New York Application October 23, 1952, Serial No. 316,525

5 Claims. (Cl. 117—107)

This invention relates to the production of adherent metal coatings, particularly on glass or glass-like surfaces.

Vapor coated metallic films comprising two or more layers have been found useful for numerous different types of applications. In accordance with prior art practice at least two separate vapor-deposition operations are required to produce such multilayer coatings.

One of the principal applications of such films is to the formation of evaporated metal electrodes on piezoelectric crystal vibrators. Such an electrode should comprise a thin flexible electrically conductive film that adheres strongly to the crystalline surface and that will make a strong solder-bond to supporting lead wires. For this purpose, it has been found advantageous to use a bi-metallic evaporated film the composition of which is graduated from an undercoating metal that is characterized by strong adherence to the crystal, to an outercoating metal to which leads can be soldered, and which preferably is also corrosion resistant. Aluminum, for example, has been found suitable for the undercoating, whereas either copper or gold serves satisfactorily for the outercoating.

One prior art method for producing coatings of the type described in the preceding paragraph comprises evaporating the two metals simultaneously, confining the respective vapor streams with baffles to form two slightly overlapping wedges, and moving the surface to be coated, first through a stream of pure undercoating metal, then through overlapping streams in which both metals are deposited simultaneously, and finally through a stream of pure outercoating metal.

The general object of the present invention is to provide an improved method and apparatus for producing strongly adherent composite metal coatings, and more particularly a method and apparatus that avoids the use of moving parts in a vacuum.

In accordance with the invention the two (or more) coating metals are evaporated in controlled time relation from respectively different portions of an electrical resistance heater placed within vapor-deposition range of the surface to be coated. More specifically, the coating metals are disposed as electrical shunts on their respective portions of the heater in such manner that after heating current is applied the several heater portions reach the vaporization temperatures of their respective shunting metals in the desired time sequence, which may, for example, be in overlapping time relation.

In accordance with a feature of the invention the aforesaid shunts comprise molten metal. To form them, solid charges of the coating metals, of appropriate volume and dimensions, are placed on corresponding portions of the heater, and current is supplied to the heater of such value that the several portions reach the melting temperature (but not the vaporization temperatures) of their respective charges. More specifically, the heater may comprise a helix of stranded resistance wire, such as tungsten, in which case the charges may be in the form of rods or the like, inserted lengthwise within the helix and of such length and volume that when they melt, they "wet" and cover the resistance wire to the desired extent.

The present invention, together with additional objects, features, and advantages, will be better understood on consideration of the specification hereinafter and the attached drawings, of which Fig. 1 is a showing of the over-all arrangement for carrying out the pesent invention;

In order to emphasize a few basic principles of vapor coating, a simple case will be considered in which evaporation takes place onto the walls of a hollow sphere from a small concentric sphere. If the small sphere is heated, atoms will fly off in all directions at speeds of about 2000 feet per second, and if, in the space intervening between the two spheres, there are very few air molecules, the metallic atoms will travel in straight lines and strike the outer sphere. It will be assumed that the atoms stick where they strike initially.

Since the volume of the metal remains the same after transference as before, when the metal of the small sphere is completely transferred to the inner wall of a hollow sphere the thickness of the coating, $t$, is such that $$v=4\pi r^2 t \qquad (1)$$

where $v$ is the volume of the small sphere, and $r$ is the radius of the spherical cavity. If the small sphere was made by melting a piece of wire of diameter $d$ mils, length $l$ centimeters, and if $t$ in centimeters is replaced by $\mathring{T}$, the deposit thickness in angstroms, and $r$ is expressed in centimeters, the equivalent of Equation 1 may be written:

$$\mathring{T}=\frac{40.3d^2l}{r^2} \qquad (2)$$

The simple case defined by Equation 2 affords a close approximation to the deposit falling perpendicularly onto a small flat surface from a short cylinder (a filament) which is at a distance of at least several times the length of the cylinder. On a flat surface, the thickness of the deposit drops off in the ratio of cos $\theta$ to 1, where $\theta$ is the angle of inclination of the surface at the reference point to the direction of the rays emitted by the source. When the dimensions of the surface to be treated are small compared to the distance from the filament, this correction can be neglected.

Figure 1:
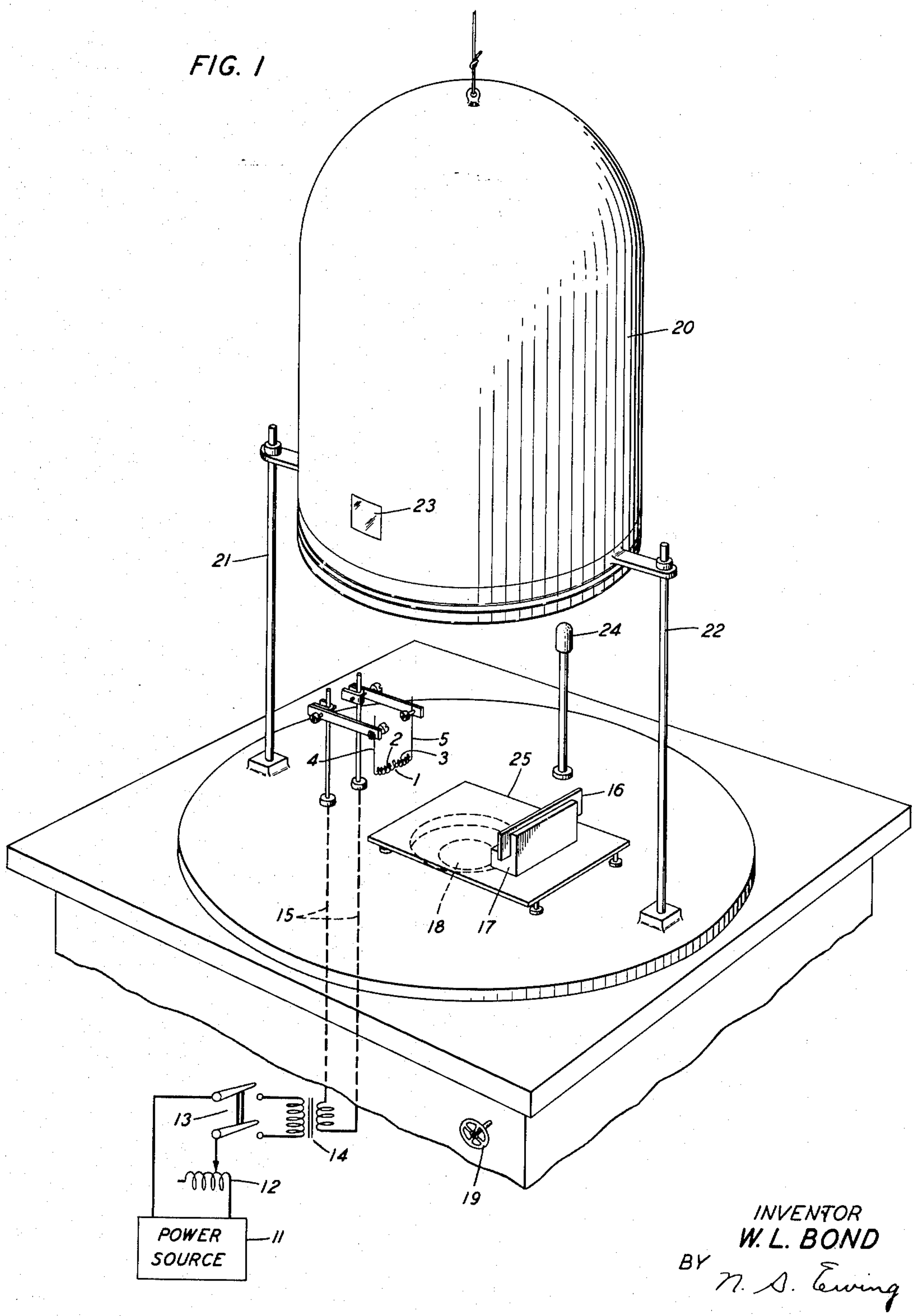
Figure 2:
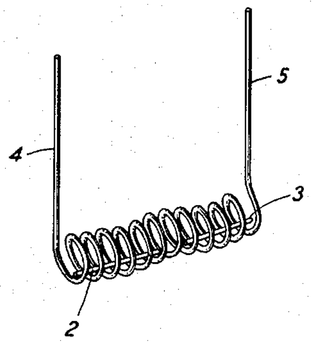
Fig. 2 is a detailed showing of a preferred form of the filament 1 of Fig. 1, showing a double-sag arrangement.

Fig. 1 of the drawings, which shows a preferred arrangement for carrying out the evaporating technique in accordance with the present invention, will now be considered in detail. One form of the filament 1 used for the evaporation process is indicated in greater detail in Fig. 2 of the drawings. This consists essentially of a stranded tungsten wire of the type generally used for open electrical coils in evaporating apparatus, which has been shaped into a double-sag helix as shown, the purpose of which is to separate in the filament the metals to be deposited. In typical arrangement, the filament 1 may comprise strands of 15 mil tungsten wire having an overall outer diameter of 40 mils. The inner portion of the filament, which has an over-all length of about a centimeter, is formed into a helix having six loops on each side, each of which has an inner diameter of the order of 90 mils. The lead ends, 4 and 5, extend about 5 centimeters from the supporting structure in a direction normal to the principal axis of the helix. These dimensions are not critical but provide a practical workable embodiment of the present invention. In order to obtain a substantially uniform coating distribution on the substratum, that is, surface to be coated, it is best to restrict the internal diameter and the number of coils to the minimum required to hold a given load. The criterion here will be the heavier load.

Assume, for example, that the coating to be supplied comprises an undercoating of aluminum, and an outer coating of copper, with a slightly overlapping intermediate layer. It has been found that strong bonds are obtained with a composite film having thickness of about 200 angstroms of aluminum and 3000 to 4000 angstroms of copper, with an overlapping layer about 100 angstroms thick. Assume now that the object to be coated is placed 10 centimeters from the filament source. For convenience in placing them in proper relation within the separate sags into which the filament has been formed, the masses of charge may take the form of small pieces of wire of appropriate length and cross-section. For the purposes of the present descriptive embodiment, the aluminum wire, to provide the undercoating material, will be assumed to have a diameter of 10 mils, and the copper wire, to provide the outercoating material, a diameter of 25 mils. The desired lengths of the respective wires needed to give the required volume of material may then be computed by substituting in Equation 2 as follows:

$$\text{Aluminum: } 200=\frac{40.3(10)^2l}{100}$$

for $$l=\frac{20{,}000}{4030}=4.95 \text{ centimeters}$$

$$\text{Copper: } 4000=\frac{40.3(25)^2l}{100}$$

or $$l=\frac{400{,}000}{25{,}500}=15.7 \text{ centimeters}$$

If heavier loads of material than contemplated in the foregoing example are used, it may be desirable to use a filament of larger internal diameter, and possibly more coils. The over-all dimensions of the filament are accordingly dependent on the loads to be dealt with. Moreover, it will be apparent that the charge may be wadded up or otherwise shaped so long as it is positioned to fit into and form a molten coating on the desired portion of the filament, in the manner to be described hereinafter.

The filament 1, the lead wires 4 and 5 of which are held in place by any suitable means, such as the clamping arrangement shown, is energized from the power source 11 which is connected thereto through a circuit including the rheostat 12, the switch 13, and the transformer 14. It is necessary that the power source 11 deliver enough current to heat the filament to the vaporization temperatures of the metals involved. This may require 20 or 30 amperes.

The body, the surface 16 of which is to be coated, which may comprise glass or crystalline material such as quartz, or any smooth surfaced material, is positioned in the supporting stand 17, so that it is centered with respect to the filament 1, with one of its major axes substantially parallel to the major axis of the latter, and the centers separated by a distance of about 10 centimeters.

In order to reduce interference from air molecules encountered in the paths of the metallic ions radiated from the filament, the working pressure during the evaporating process is reduced considerably below atmospheric level. A suitable pressure for this purpose is 2 times $10^{-5}$ millimeters of mercury. To enable the evaporation process to be carried out in the necessary vacuum, an enclosure is arranged for the evaporating facilities which includes a bell-shaped cover 20 supported so that it may be moved into air tight engagement with the supporting table. A window 23 is provided in the cover, in such a position as to provide good visibility of the filament, so that when the cover 20 is in position, the evaporation process may be observed. A valve 18, regulating handle 19, and conventional pumping equipment not shown, are provided for creating the desired vacuum.

The aluminum glow-discharge electrode 24, and metal ground plate 25, upon which rests the supporting stand 17, are connected through an electrical circuit to serve as a source of ionic discharge for cleaning the surface of the plate 16 prior to coating. The external circuit (not shown) which connects the glow-discharge electrodes may include for example a regulating rheostat, a 600 volt transformer, and a source of power sufficient to provide a discharge current of the order of 600 milliamperes. This method of cleaning surfaces to be plated is briefly referred to on page 165 of "Procedures in Experimental Physics," Strong et al. (Prentice-Hall Inc.).

Prior to the evaporating process, and after a preliminary cleaning in a manner described by Strong, supra, the glow-discharge circuit is connected, and the vacuum pump set to operate. When the chamber is sufficiently evacuated to provide the requisite mean-free paths between the air molecules, the glow-discharge takes place between electrode 24 and ground plate 25, producing bombarding ions which impinge on and remove any spurious material from the surface of the plate 16. The glow-discharge is continued for 2 to 5 minutes, or longer, if a greater degree of cleansing is desired.

Figure 3:
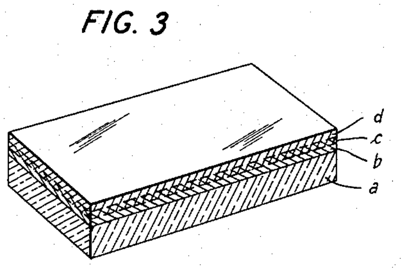
Fig. 3 is a perspective showing of an element coated in accordance with the present invention.

The evaporation process is carried out as follows. During the first 5 or 10 seconds after closure of the switch 13, the rheostat 12 is adjusted to permit passage of current of the order of 10 amperes in the filament 1, so that the filament rapidly heats up to a temperature slightly above the melting points of both aluminum and copper. The temperature is substantially uniform along the filament 1 before low resistance contact is made by the melting of the coating metals, and may be, for example, of the order of 900 degrees Kelvin. During this interval the operator observes the process through the window 23, noting that the metallic elements 2 and 3 melt, wetting and coating separate portions of the surface of the tungsten filament 1. When this stage is completed, the rheostat 12 is then adjusted to permit the passage of a much higher current in the filament 1, of the order of 20 or 30 amperes, thereby bringing the two parts of the filament to temperatures above say, 2000 degrees Kelvin for a period of about 10 seconds, during which interval, first the aluminum, and then the copper is evaporated onto the surface 16, in somewhat overlapping order. It is apparent that the quantity of aluminum shunting one end of the filament 1 is enough smaller than the quantity of copper shunting the other end thereof, that the filament on the end adjacent the aluminum heats up first, evaporating the aluminum first. Before all of the aluminum is evaporated, enough heat is generated on the copper side to cause this metal to start evaporating, so that in an intermediate stage both aluminum and copper are being evaporated simultaneously. Due to the larger mass of copper, all of the aluminum is evaporated before complete evaporation of the copper takes place, so that the final layer consists of pure copper. The current through the circuit is maintained at a sufficiently high value to keep the copper at the boiling point even after the aluminum shunt has completely boiled off. Note Fig. 3 of the drawings, showing in perspective a cross-sectional view of the coated element, on which *a* indicates the glass or crystalline substratum, *b* indicates the under layer of aluminum having a thickness of the order of $10^{-5}$ millimeters, *c*, an intermediate layer which consists of a mixture of copper and aluminum of the order of $10^{-5}$ millimeters thick, and *d*, a layer which consists of pure copper of the order of 4 x $10^{-4}$ millimeters thick.

Physical tests made with an embodiment such as that described in the preceding paragraphs have shown that 12 mil wires soldered to the upper copper layer of a film having a surface area of .005 square centimeter withstood pull tests up to 10 pounds. Examination of the surface after the break occurred showed that part of the glass or quartz substratum was chipped away with the coating, thus giving physical evidence of a strong bond between the coated surface and the coating.

Figure 5:
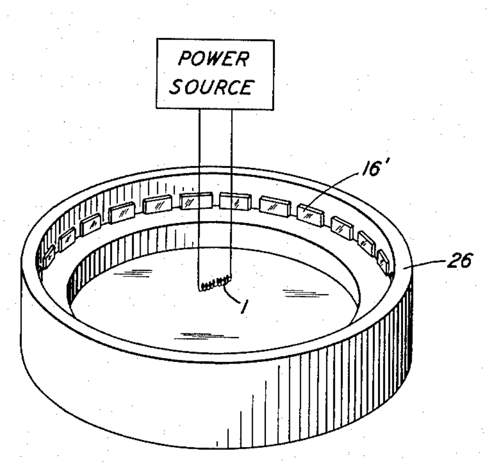
Fig. 5 is an arrangement in accordance with the present invention for coating a large number of surfaces simultaneously.

Assuming that for commercial purposes it is desired to coat a large number of glass or crystalline elements simultaneously, an arrangement such as indicated in Fig. 5 of the drawings can be provided. This includes a filament 1, of the type previously described, coaxially arranged within the hollow cylindrical mounting 26, for substantially uniformly coating the surfaces 16′ of elements which are arranged around the inner periphery of the mounting 26, in such a manner that each is substantially centered in a vertical plane with respect to the filament 1, and separated therefrom by a distance of about 10 centimers. The evacuating and cleaning arrangements are similar to those described with reference to Fig. 1.

In principle, the present invention is concerned with so regulating the current flow through different parts of the heater circuit that the temperature of the heater adjacent each of the coating metals, and hence the time interval during which each of these metals is evaporated can be selectively controlled. This regulation is accomplished by utilizing each mass of coating material as a shunt across that individual element of the heating circuit positioned to supply a major portion of the heat for evaporation of that respective mass. The amount of heat supplied to each of the composite conducting elements is a function of the over-all current supplied from the connected power source, and its respective resistance per unit length.

A preferred method for establishing the desired shunting contact between the heating element and the masses to be evaporated is by melting or coating each of the masses onto a different portion of the heating element to form a pair of composite conducting elements. If the heating element comprises a helical coil, as in the present illustrative embodiment, this is accomplished by placing the metallic charge in the form of small pieces of wire in lengthwise positions within the different sections of the coiled filament, such that the passage of smaller amounts of current than required for evaporation will cause the elements of charge to melt and coat different portions of the heating element substantially uniformly with each of the metals to be evaporated.

A desirable condition, such as carried out in the present illustrative embodiment, is that the coating metal which is arranged to boil off first, thereby providing the undercoating, shall comprise a material which bonds strongly to the surface to be coated. Inasmuch as most piezoelectric crystals, and also glass, include oxygen in their compositions, an undercoating material is preferable which bonds strongly to oxygen. In addition to aluminum disclosed, materials suitable for this purpose include chromium, titanium, iron, nickel, and cobalt. Desirable characteristics for the outercoating material are that it sustain strong solder bonds, and that it resist corrosion. Suitable materials for this purpose, in addition to copper disclosed, are gold, or a bronze comprising a mixture of aluminum and copper.

It is preferred that the metals used for the purposes of the present invention are such as to pass through a liquid or molten state prior to evaporation. For best results, the melting points should probably be several hundred degrees below the evaporating points. It is by means of this melting onto or "wetting" of the surface of the heater element that low resistance contact is made between the coating metal and the heater coil for providing the current shunt. Other than this, the melting points of the coating metals are not of critical interest, the principal emphasis of the present invention being on the order in which the respective coating metals reach their boiling points. This latter is a function of the rates at which they are heated, of current flow through the adjacent heating filaments, and also of the inherent boiling levels of the coating metals, and of the operating pressure which, for reasons explained hereinbefore, is usually maintained considerably below atmospheric level. The boling points of the coating metals at the working pressure are of critical interest, since with the exception of chromium and titanium only a negligible amount of evaporation occurs below the boiling point. Above the boiling point the rate of evaporation increases as the temperature is raised. It is preferable that the heating filament comprise a material such as tungsten from which there is negligible evaporation at the temperatures utilized for vaporizing the coating metals.

Figure 4:
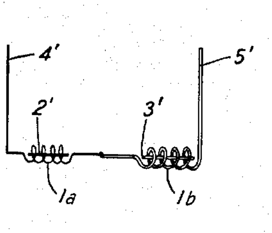
Fig. 4 is an alternative form of the filament 1 of Fig. 1, using a pair of filaments in series.

Within the scope of the present invention, various configurations are possible for providing the desired time delay between two or more coating metals in reaching their respective evaporating points. These include the evaporation of the different metallic coatings from two separate but closely adjacent filaments, which, for example, may be connected in series, as indicated in Fig. 4 of the drawings, wherein each of the filaments may comprise wire of different resistance, length, or diameter. In this way, the relationship between the resistance of the heating element and the metal charge to be evaporated, may be closely controlled, regardless of arbitrary requirements regarding the size of the latter, to produce a desired coating thickness.

What is claimed is:

1. The method of vapor depositing a composite coating comprising metals A and B on a substrate element within vapor deposition range of a high resistance heater wire, which method comprises forming a molten coating of metal A of a first thickness on a first section of said high resistance heater wire, forming a molten coating of a metal B of a second thickness on a second section of said heater wire in series connection with said first section, whereby the composite conductors formed by said first and second coated sections of heater wire have substantially different resistances per unit length, and whereby the said relative resistances per unit length control the relative rates of heat dissipation in said sections of heater wire, increasing the current in said heater wire until a preselected one of said metals begins to boil before the other of said metals, and maintaining the current in said heater wire until the other of said metals boils.

2. In the application of a composite metallic coating to an object by vapor deposition from a high resistance heating filament within vapor deposition range of said object, the method of controlling the order of evaporation of each of a plurality of evaporant metals which comprises placing charges of respectively different masses of said metals in non-overlapping relation on different series-connected sections of said high-resistance heating filament, passing current into said heating filament until each of said charges melts forming a substantially homogeneous evaporant coating on its corresponding section of said heating filament, each of said coatings having a substantially different thickness, utilizing the differential shunting action of said respective coatings to control the heat dissipation in said sections, subsequently increasing the passage of current in said heating filament until a preselected one of said evaporant coatings reaches its boiling point, and maintaining the passage of current in said heating filament while the remaining evaporant coatings on said filament each reach their respective boiling points and evaporate in staggered time relation.

3. The method of vapor depositing on a substrate element from a high resistance heater wire within vapor-deposition range of said element, a composite coating comprising an undercoating of aluminum an outer coating of copper, and a mixed intervening portion, said method comprising forming a molten coating of aluminum of a given thickness on a first section of high resistance heater wire, forming a molten coating of copper of a thickness substantially greater than said given thickness on a second section of said heater wire in series connection with said first section, whereby the composite conductor formed by said aluminum-coated section of heater wire has a substantially higher resistance per unit length than the composite conductor formed by said copper coated section of heater wire, passing sufficient current through said heater wire to bring said aluminum to its boiling point, and maintaining the current in said heater wire until said copper boils.

4. The method of vapor depositing on a substrate element from a high resistance heater wire within vapor deposition range of said element, a composite coating comprising an undercoating of aluminum, an outer coating of copper, and a mixed intervening portion, said method comprising placing a small mass of aluminum and a substantially larger mass of copper in non-overlapping relation with each other and in shunting relation with several turns of different series-connected sections of a helical coil of high resistance heater wire, passing sufficient current through said coil to cause each of said masses to melt, wetting the turns in each of the respective sections of said coil, and forming therewith a molten coating, whereby said copper coating is substantially thicker than said aluminum coating causing said aluminum coated section to have a substantially greater resistance per unit length than said copper coated section, substantially increasing the passage of current in said coil until said aluminum coating reaches its boiling point, and maintaining the current in said coil until said copper reaches its boiling point.

5. The method of selectively controlling the vapor deposition upon a substrate surface of a plurality of evaporant metals evaporated from a like plurality of different serially arranged portions of a common electrical resistive heating element positioned within vapor deposition range of said substrate surface, said method comprising placing predetermined discrete charges of said metals on said plurality of serially arranged portions of said heating element, respectively, passing an electrical current through said resistive heating element sufficient only to cause all of said metallic charges to become molten and to coat their respective portions of said heating element whereby the effective electrical resistances of said portions are altered to effect a predetermined distribution of the total power dissipated by said heating element, and increasing the electrical current through said heating element sufficiently to cause said molten metals to evaporate successively in an order determined by the respective evaporation characteristics of said metals and the distribution of power effected by the selective coating of said portions of said heating element.

References Cited in the file of this patent

UNITED STATES PATENTS

| | | |
|---|---|---|
| 2,260,471 | McLeod | Oct. 28, 1941 |
| 2,304,834 | Lenz | Dec. 15, 1942 |
| 2,384,576 | Swope | Sept. 11, 1945 |
| 2,391,595 | Richards et al. | Dec. 25, 1945 |
| 2,410,720 | Dimmick | Nov. 5, 1946 |
| 2,432,657 | Colbert et al. | Dec. 16, 1947 |
| 2,482,329 | Dimmick | Sept. 20, 1949 |
| 2,569,852 | Green | Oct. 2, 1951 |